(12) United States Patent
Ijntema et al.

(10) Patent No.: US 6,285,350 B1
(45) Date of Patent: *Sep. 4, 2001

(54) COLOR CORRECTION

(75) Inventors: Dominicus J. Ijntema, Palo Alto, CA (US); Terence Doyle, Noisy le Roi (FR); Adrianus L. G. Van Den Eeden, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,043

(22) Filed: Nov. 23, 1998

(30) Foreign Application Priority Data

Nov. 22, 1997 (EP) .................................................. 97203660

(51) Int. Cl.⁷ ................................. G09G 5/02; H04N 9/73
(52) U.S. Cl. ............................................. 345/151; 348/223
(58) Field of Search .................................. 345/10, 11, 22, 345/150, 151, 207; 315/8, 10, 11.5; 358/515, 516, 518, 519, 520, 532; 348/223, 227

(56) References Cited

U.S. PATENT DOCUMENTS

| | | |
|---|---|---|
| 4,386,345 * | 5/1983 | Narveson et al. ....................... 345/22 |
| 5,060,075 | 10/1991 | Skinner . |
| 5,847,858 | 12/1998 | Krings et al. ......................... 359/265 |
| 5,859,735 | 1/1999 | De Vries ............................... 359/885 |

FOREIGN PATENT DOCUMENTS

| | | | |
|---|---|---|---|
| WO9534088 | 12/1995 | (WO) | ............................. H01J/29/89 |
| WO9722906 | 6/1997 | (WO) | ............................. G02F/1/153 |
| WO9734192 | 9/1997 | (WO) | ............................. G02F/1/153 |

OTHER PUBLICATIONS

Van Nostrand's Scientific Encyclopedia, Eighth Edition, 1995, p. 2660.

* cited by examiner

*Primary Examiner*—William A. Cuchlinski, Jr.
*Assistant Examiner*—Thu Nguyen
(74) *Attorney, Agent, or Firm*—Edward W. Goodman

(57) ABSTRACT

In a display apparatus having a display device (CRT), a variable light transmission panel or coating (P) at a front side of the display device (CRT), amplifiers ($A_R$, $A_G$, $A_B$) for furnishing color signals to control terminals of the display device (CRT), and a control unit (C) for controlling the variable light transmission panel or coating (P) and the amplifiers ($A_R$, $A_G$, $A_B$), the amplifiers ($A_R$, $A_G$, $A_B$) are controlled in such a manner that a color deviation of the variable light transmission panel or coating (P) is compensated for.

2 Claims, 1 Drawing Sheet

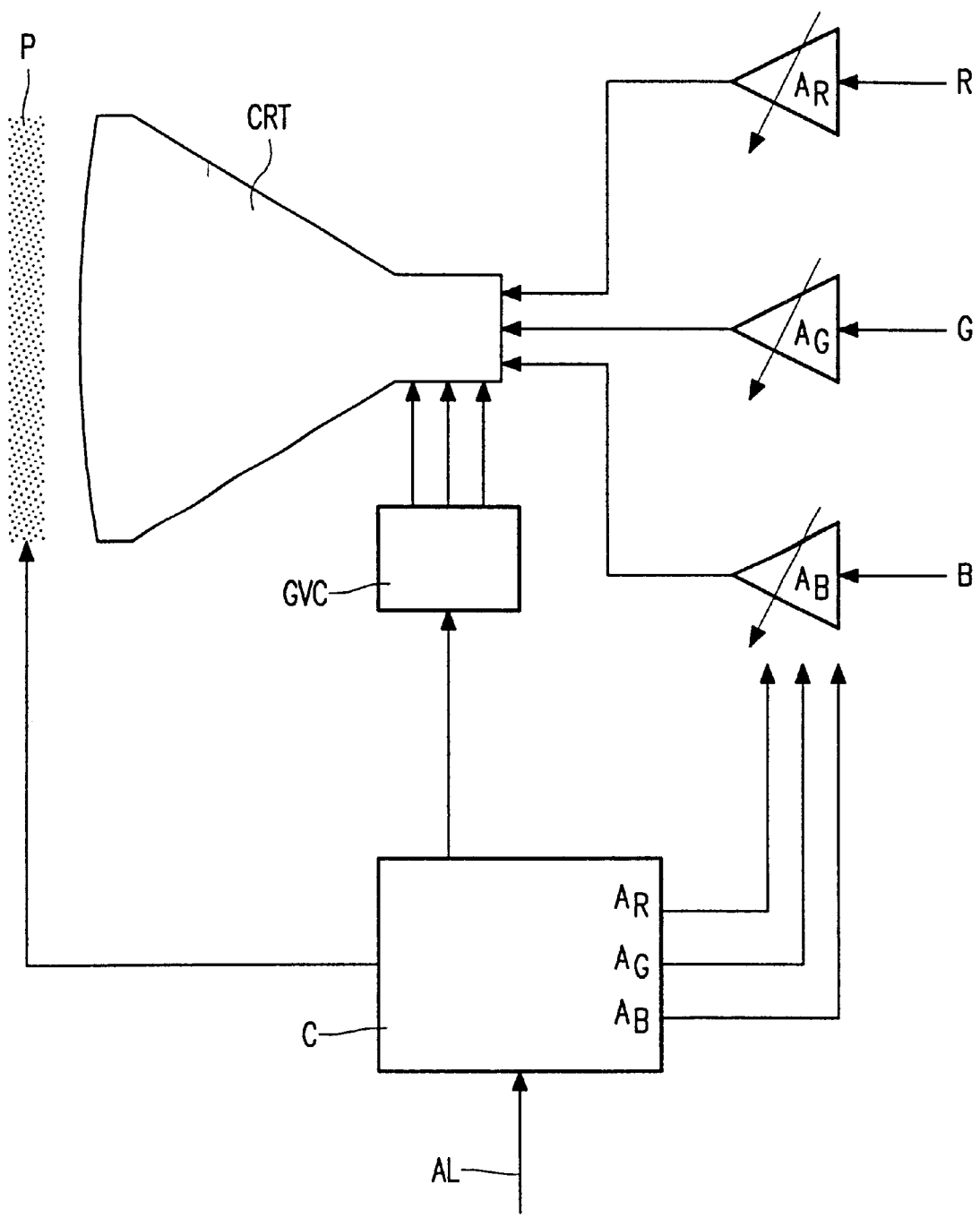

COLOR CORRECTION

BACKGROUND OF THE INVENTION

1. Field of the Invention

The invention relates to a color correction for a (CRT) display device with a variable light transmission panel or coating.

2. Description of the Related Art

As described in U.S. Pat. No. 5,060,075, the perceived contrast of an image produced by a CRT display can be improved by using a variable light transmissivity panel adjacent to the CRT faceplate or by applying a variable transmissivity coating on the tube faceplate. The transmission of the panel or coating can be changed as function of the ambient lighting. Generally, the transmissivity of the panel decreases in response to an increasing ambient light intensity. For lower ambient light conditions, this will result in CRT tube with a higher transmissivity, resulting in a lower electron beam current which then result in a sharper picture and a lower energy consumption. Also, the gun characteristics can be changed. Normally the gun is optimised for larger currents. However, when the transmissivity of the panel is high and thus the electron beam current is low, the characteristics of the gun can be changed is such a way that the gun is optimal for lower beam currents. This can be done by changing the grid voltages. The transmissivity of a variable light transmission panel is controlled by applying a voltage to the panel.

As acknowledged in U.S. Pat. No. 5,847,858, corresponding to International Application No. WO-A-97/22906 and International Application No. WO-A-97/34192, corresponding to U.S. Pat. No. 5,859,735, some types of transmission panels are not an ideal neutral (grey) filter, but have a transmission $T(\lambda)$ which is not constant for the visible wavelength $\lambda$. Also, the shape of transmission curve $T(\lambda)$ changes as a function of the applied voltage. In other words, the color of the panel is not grey, and changes as a function of the perceived transmissivity. If such a panel, for example, an electrochromic panel, is applied, the appearance of the colors produced by the tube-panel combination will change. The used electrochromic sample resulted in a bluish picture, because the transmissivity of red and green decreases faster than the transmissivity of blue, when the perceived transmissivity is decreased. To solve these problems, WO-A-97/22906 and WO-A-97/34192 propose to use adapted electrochromic elements for the transmission panel/coating.

SUMMARY OF THE INVENTION

It is, inter alia, an object of the invention to provide a solution in which it is not necessary to use special coatings. To this end, a first aspect of the invention provides a display apparatus having variable light transmission means in which color deviations are compensated. An advantageous embodiment of the display apparatus includes means for linearizing the applied color signals, matrix means for compensating the color deviations, and gamma correction means for furnishing color signals to control terminals of the display device.

In a display apparatus in accordance with a primary aspect of the invention that comprises a display device, a variable light transmission panel or coating at a front side of the display device, amplifiers for furnishing color signals to control terminals of the display device, and a control unit for controlling the variable light transmission panel or coating and the amplifiers, the amplifiers are controlled in such a manner that a color deviation of the variable light transmission panel or coating is compensated for.

Attention is drawn to the fact that while U.S. Pat. No. 5,060,075 also shows a drive amplifier 13 which is controlled by the panel control circuitry, the purpose of this known amplifier control is limited to improve image contrast by varying the beam current with variations in ambient light. That U.S. Pat. No. 5,060,075 does not relate to color deviations is also apparent from the fact that its CRT has only a single cathode to which the single drive amplifier 13 is connected.

These and other aspects of the invention will be apparent from and elucidated with reference to the embodiments described hereinafter.

BRIEF DESCRIPTION OF THE DRAWING

FIG. 1 shows a schematical drawing of an embodiment of a color correction system in accordance with the present invention.

DESCRIPTION OF THE PREFERRED EMBODIMENTS

A limited but satisfactory correction of the color errors can be obtained by correcting the white point of the tube-panel combination. If the panel transmission of each tube phosphor is known as function of the applied voltage to the panel, and also the shift of the color points in xy chromaticity coordinates is known, the white point can be corrected. This can be done by amplifying the RGB signals with an amplification factor which is only a function of the applied voltage (transmission) of the panel.

To fully compensate the color errors, the RGB signals have to be linearized by compensating for the gamma correction applied in the camera (i.e., $R^\lambda$, etc.). Then, a transformation of the RGB signals with a 3×3 matrix can be done. Finally, the gamma correction has to be applied again (i.e., $R^{1/\lambda}$, etc.). The matrix coefficients depend on the panel transmission.

A digital implementation in a programmable video signal processor (VSP) has been used to prove the feasibility of the concept. The main task of the VSP is to amplify the digitized RGB signals by a constant factor in such a way that the white point is always correct for various transmissivities of the panel. The characteristics of the panel were measured for 5 different applied voltages. For voltages which are not measured, the characteristics were simply interpolated. A PC computed the correct white point settings as function of the applied voltage, and modified the amplification factors in the VSP. The transmissivity of the panel was adjusted as function of the ambient light. The ambient light was measured with a photo-diode with a sensitivity close to the eye-sensitivity. The relation between the ambient illumination and the transmission of the panel was non-linear. The results were promising.

A cheaper solution can be obtained by using analog RGB amplifiers with adjustable gains or by using a customized digital implementation. The gains are changed as function of the applied voltage (transmissivity) of the panel. The characteristics could be stored in a LUT.

A schematical drawing of the color correction system is shown in FIG. 1. The display apparatus has a display device CRT in front of which a variable light transmission panel P is placed. The panel P is controlled by a unit controller C which receives an ambient light signal AL. The unit controller C controls a grid voltage circuit GVC which furnishes grid voltages for the display device CRT. In accordance with the present invention, the unit controller C computes for a given panel transmissivity setting, the ratio of the R, G and B signals, necessary to obtain white. Normally, without panel, this ratio would be 1:1:1. Color signal amplifiers for the red, green and blue cathodes of the display device CRT are controlled in such a manner, that the amplifiers will now have respective amplifications $A_R$, $A_G$, and $A_B$ corresponding to the computed ratio, corrected for the gamma of the tube.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In the device claim enumerating several means, several of these means can be embodied by one and the same item of hardware. The invention can advantageously be used in TV sets and (computer) monitors.

What is claimed is:

1. A display apparatus comprising:

a display device;

variable light transmission means at a front side of said display device, said variable light transmission means having a variable light transmissivity, and having color characteristics which deviate with changes in the light transmissivity of said variable light transmission means;

processing means for furnishing color signals to control terminals of said display device; and control means for controlling said variable light transmission means and said processing means, wherein said processing means is controlled such that said color characteristic deviation of said variable light transmission means is compensated for at different transmissivities of said variable light transmission means.

2. A display apparatus as claimed in claim 1, wherein said processing means comprises:

means for linearizing applied color signals;

matrix means for compensating said color characteristic deviation of said variable light transmission means; and gamma correction means for furnishing color signals to control terminals of said display device.

* * * * *